(12) United States Patent
Braun et al.

(10) Patent No.: US 8,133,124 B2
(45) Date of Patent: Mar. 13, 2012

(54) SYSTEM AND METHOD FOR A GOLF TOURNAMENT

(76) Inventors: David J. Braun, Newtown, PA (US); Thomas A. Belton, Princeton, NJ (US)

( * ) Notice: Subject to any disclaimer, the term of this patent is extended or adjusted under 35 U.S.C. 154(b) by 1131 days.

(21) Appl. No.: 11/908,203

(22) PCT Filed: Mar. 10, 2006

(86) PCT No.: PCT/US2006/008974
§ 371 (c)(1),
(2), (4) Date: Sep. 10, 2007

(87) PCT Pub. No.: WO2006/099340
PCT Pub. Date: Sep. 21, 2006

(65) Prior Publication Data
US 2009/0239685 A1    Sep. 24, 2009

Related U.S. Application Data

(60) Provisional application No. 60/660,212, filed on Mar. 10, 2005, provisional application No. 60/737,593, filed on Nov. 17, 2005.

(51) Int. Cl.
*A63B 57/00* (2006.01)
*G06F 19/00* (2006.01)
(52) U.S. Cl. ........................ 473/131; 473/409
(58) Field of Classification Search .............. 473/131, 473/409; 700/91–93
See application file for complete search history.

(56) References Cited

U.S. PATENT DOCUMENTS

| | | | |
|---|---|---|---|
| 5,949,679 A | 9/1999 | Born et al. | |
| 2001/0051835 A1 | 12/2001 | Cline | |
| 2002/0049508 A1* | 4/2002 | Williams | 700/92 |
| 2005/0049060 A1* | 3/2005 | Bell | 473/169 |

OTHER PUBLICATIONS

Author Unknown, 2004 Ryder Cup Format and Rules, 2 pages, obtained online at http://www.golf.com/rydercup/2004/schedule/default.asp.

* cited by examiner

*Primary Examiner* — Dmitry Suhol
*Assistant Examiner* — Alex F. R. P. Rada, II
(74) *Attorney, Agent, or Firm* — Fox Rothschild LLP; Richard C. Woodbridge; Perry M. Fonseca

(57) ABSTRACT

The present invention enhances a golf tournament using novel tournament scoring and novel rules that include allowing viewer interaction with a live tournament to affect the outcome of the tournament. In a match play golf tournament, the number of tournament points awarded to a match winning team is directly proportional to a sum of the difference in the number of holes won and the number of holes left to play. In addition, elected spectators of the event may participate in a team's compliance with one or more of the tournament rules, such as selecting a player whose results will be counted double. The tournament is preferably based on the Ryder cup format, but condensed into a single day.

2 Claims, 3 Drawing Sheets

SYSTEM AND METHOD FOR A GOLF TOURNAMENT

CROSS REFERENCE TO APPLICATIONS

This application is related to, and claims priority from PCT application no. PCT/US2006/008974 filed on Mar. 10, 2006 by David J. Braun and Thomas A. Belton and entitled "A System and Method for a Golf Tournament" and claims priority to U.S. Provisional Patent application No. 60/660,212 on Mar. 10, 2005 filed by David J. Braun and Thomas A. Belton et al. titled "System and Method for a Golf Tournament", and to U.S. Provisional Patent application No. 60/737,593 on Nov. 17, 2005 filed by David J. Braun and Thomas A. Belton et al. titled "System and Method for Enabling Remote Participation in a Broadcast Sporting Event", the entire contents of which are hereby incorporated by reference.

TECHNICAL FIELD

The present invention relates to systems and methods for tournaments, and, more particularly, to systems and methods for staging and scoring golf tournaments.

BACKGROUND ART

Golf is a game with a long tradition that has become popular worldwide and on television.

While most many golf matches use the number of strokes as a way of scoring the game, an alternative is to use the number of holes won in a system called match play golf.

In traditional match play golf, players compete hole by hole, and the golfer who wins the most holes wins the match. Scoring is in match play match golf traditionally is rendered relationally, i.e., if player A has won 5 holes and player B has won 4 holes, the score is not 5 to 4, but rather 1-up for player A, or 1-down for player B. Essentially, match play scoring tells golfers and spectators not how many holes each golfer has won, but how many more holes than his opponent the golfer in the lead has won. If the match is tied, it is said to be "all square."

Match play matches do not have to go the full 18 holes. They often do, but just as frequently one player will achieve an insurmountable lead and the match will end early. If, for instance, player A has a score of 6-up with 5 holes to play, player A has clinched the victory, and the match is over.

The final score is reported as 1 up if it went the full 18 holes, or else 2 and 1, 3 and 2, etc. to reflect the fact that the winner was 2 games up with one hole to play or 3 games up with 2 holes to play.

There are numerous formats for team match-play tournaments, only a few of which are typically used in televised tournaments, including the popular "skins" format and the format used in the Ryder cup tournament.

A "skins game" is a golf betting game that pits members of a foursome (or threesome or twosome) against each other in a type of match play. Each hole carries a value, and the winner of the hole wins that amount. Ties, or halves, result in the bet amount being carried over to the following hole, adding to the pot.

When a player wins a hole, they've won the "skin." Professional skins games are ubiquitous, having grown since the debut of the Skins Game in 1983 (Jack Nicklaus, Arnold Palmer, Gary Player and Tom Watson were the original participants).

Because of carryovers, pro skins games often result in a single hole being worth tens—even hundreds—of thousands of dollars (of course, the pros are playing for someone else's money).

The most watched match play golf event is, however, is the Ryder cup, which is a team event. The Ryder Cup is a competition between two teams, the USA and Europe, which, since 1981, has the form of a 3-day event with four foursomes and four fourballs on both days 1 and 2, and 12 singles matches on day 3, for a total of 28 possible points.

In fourballs matchplay, each side consists of two players. Each player plays his or her own ball throughout the round. On each hole, the low ball of the two players serves as that side's score. For example, on the first hole for Team A, Player 1 scores a 4 and Player 2 scores a 5, so the team score is 4. If Team A gets a 4 while Team B scores 5, then Team A wins the hole.

In foursomes, 2-person teams play against each other, with each team playing one ball, alternate shot. Example: Player A and Player B are partners. On the first hole, A tees off; B plays the second shot; A plays the third shot; and so on until the ball is holed. The lower of the two teams' scores win the hole.

In the Ryder cup, as in most tournaments, the winning team or individual in any one match, whatever the format, scores one tournament point, the loser gets none, and in a tied match both score half a point. The tournament points are awarded independently of how closely the match was contested, and the team that has the most points at the end of the event, wins the tournament.

DISCLOSURE OF INVENTION

The present invention relates to a system and method for a golf tournament that enhances the entertainment value of the event by introducing novel tournament scoring and novel rules that allow viewer interaction with a live tournament.

In a preferred embodiment, the novel scoring and rules are incorporated into a team match play golf tournament. Selected spectators, or viewers of the event, who may, for instance, be watching in person or via a televised broadcast, may participate in a team's compliance with one or more of the tournament rules. In this way, the tournament method of this invention facilitates viewer participation in a way that may affect the outcome of the event.

In a preferred embodiment of the invention, the tournament is based on the Ryder cup format, but condensed into a single day. Two teams of eight players compete. In the morning, there are multi-ball team match play matches such as, but not limited to, alternate-shot foursomes matches and better-ball four-ball matches. In the afternoon, there are individual match play matches. The winner of the tournament is the team with the most points. In the preferred embodiment of the present invention, however, the match scoring system factors in the margin of victory. For instance, rather than simply awarding one point for a win and half a point for a tie, the number of tournament points awarded for winning a match is related to the margin of victory.

Match play golf scores are typically expressed as a combination of the number of holes ahead and the number of holes remaining. In a preferred embodiment of the invention, the number of tournament points awarded for winning a match is the sum of the number of holes ahead and the number of holes remaining.

In addition, the present invention allows for selecting a "2× player", who's score counts double, in, for instance, the individual match play. Moreover, the choice of the 2× player may be made, or influenced, by the non-playing team members who are spectators that pay to belong to a particular team. In the event that some of the non-playing members are remote to the event, the choice of the 2× player may, for instance, be made in part based on voting over an internet connection. The tournament of the present invention also allows for a substitute player in the individual match play matches. A decision regarding the choice of a substitute may also be made, or influenced, by the non-playing team members.

Other aspects of the present invention designed to make the tournament more interesting may include a shot clock, which in a further preferred embodiment only allows a player 30 seconds to take their shot once they have reached their ball and determined the yardage. Failure to complete the shot within the required time may, for instance, result in a one shot penalty.

These and other features of the invention will be more fully disclosed in the following detailed description.

BEST MODE FOR CARRYING OUT THE INVENTION

Figure 1:
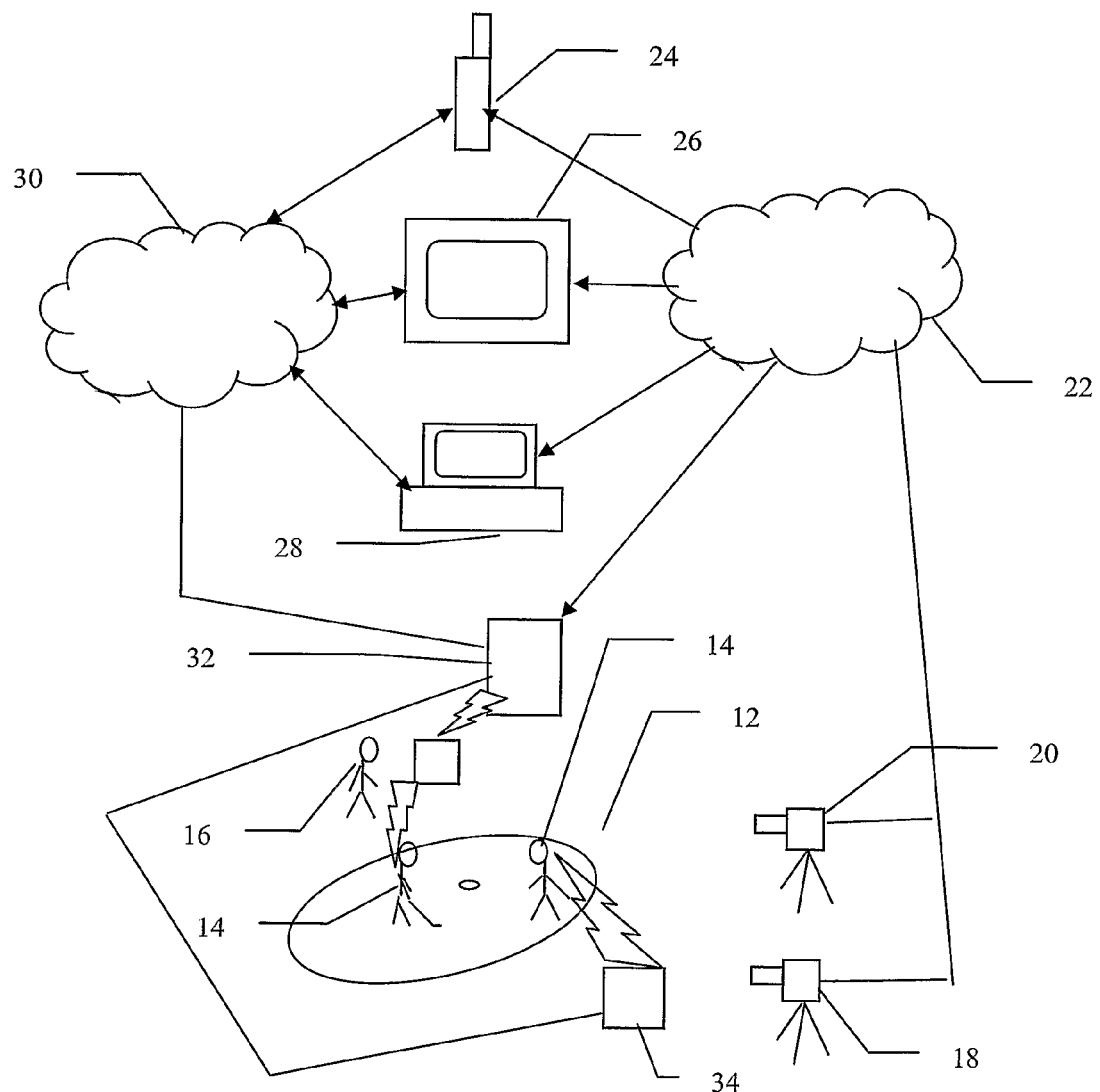
FIG. 1 is a schematic drawing showing a broadcast golf tournament being staged in accordance with a preferred embodiment of the present invention.

The present invention provides a system and method for staging a golf tournament that has allows greater interaction between the tournament competitors and the tournament viewers.

In a preferred embodiment of the invention, the golf tournament uses match play scoring modified by the additional scoring concepts of this invention.

In a preferred embodiment of the tournament of the present invention, the number of points in awarded for winning a match will, for all formats, be dependent to some degree on how closely the match was contested.

In a preferred embodiment, the match scoring would follow conventional match play scoring in using the number of holes ahead a winning contestant is at the conclusion of the match and the number of holes remaining when the match is concluded. In a conventional match play golf tournament, the points awarded for wining a match are simply one for a win, none for a lose and half each for finishing even. In a golf tournament, or golf game, scored in accordance with a preferred embodiment of the present invention, the points awarded for winning a match may be the sum of the number of holes ahead and the holes remaining at the conclusion of the match, as detailed in table 1 below.

TABLE 1

Tournament points for winning a match varying according to the margin of victory.

| Holes ahead | Holes remaining | Score Example | Points Awarded for Winning a Match |
|---|---|---|---|
| 0 | 0 | Even | 0 |
| 1 | 0 | 1 up | 1 |
| 2 | 0 | 2 up | 2 |
| 2 | 1 | 2 and 1 | 3 |
| 3 | 1 | 3 and 1 | 4 |
| 3 | 2 | 3 and 2 | 5 |
| 4 | 2 | 4 and 2 | 6 |
| 4 | 3 | 4 and 3 | 7 |

TABLE 1-continued

Tournament points for winning a match varying according to the margin of victory.

| Holes ahead | Holes remaining | Score Example | Points Awarded for Winning a Match |
|---|---|---|---|
| 5 | 3 | 5 and 3 | 8 |
| 5 | 4 | 5 and 4 | 9 |

In this way a winner of match is awarded more points for winning by a greater margin.

One of ordinary skill in the art will readily appreciate that there may be many variants of this scoring system in which the points awarded for winning a match-play match of golf are dependent on the margin of victory in the match. For instance, half a point may be awarded to each contestant for a match that ends even, while the remainder of the scoring in table 1 applies to other outcomes. Or the number of points awarded to contestant, i.e., the player or team, that wins the match may be directly proportional to the sum of the number of holes ahead and the number of holes remaining, with the constant of proportionality being any suitable integer or floating point number. Or the number of tournament points awarded to the match winning player may increases incrementally corresponding to the number of holes remaining in the manner shown in, for instance, Table 2.

In Table 2 the number of points for winning a match varies between 0.5 and 5 points depending on by how much the match was won. For instance the number of points may depend on a formula that it is a minimum of 0.5 and maximum of 5, and is closest to half the maximum number in the final score, i.e., a match won by 3 and 2 would be worth 1.5 points, a match won by 8 and 7 would be worth 4 points. Alternatively, a table such as table 1 may be used to relate the number of points for winning the match to the final score.

TABLE 2

Match points related to the final score in one embodiment.

| Final Score | Match points |
|---|---|
| Even | 0.5 |
| 1 up | 1 |
| 2 and 1 | 1 |
| 3 and 2 | 1.5 |
| 4 and 3 | 2 |
| 5 and 4 | 2.5 |
| 6 and 5 | 3 |
| 7 and 6 | 3.5 |
| 8 and 7 | 4 |
| 9 and 8 | 5 |

In a preferred embodiment, the tournament of this invention will be a one day event, loosely based on the Ryder cup format. In particular, the tournament will be between two teams, each team comprising 8 players. In the morning, four to eight players from each team will play two to four foursomes (alternate shot) matches, and four to eight players from each team will play two to four four-ball (best ball) matches. In the afternoon the eight players will all play one match of individual match play against the eight players of the other team.

In a preferred embodiment, foursome play will be governed by USPGA rule 29: 29-1. General. In a threesome or a foursome, during any stipulated round the partners must play alternately from the teeing grounds and alternately during the play of each hole. Penalty strokes do not affect the order of play. 29-2. Match Play. If a player plays when his partner should have played, his side loses the hole. 29-3. Stroke Play. If the partners make a stroke or strokes in incorrect order, such stroke or strokes are canceled and the side incurs a penalty of two strokes. The side must correct the error by playing a ball in correct order as nearly as possible at the spot from which it first played in incorrect order. If the side makes a stroke on the next teeing ground without first correcting the error or, in the case of the last hole of the round, leaves the putting green without declaring its intention to correct the error, the side is disqualified.

In a preferred embodiment, the four ball (better ball) match will be governed by the United States Golf Association rule number 30. In better ball play, the low score from each team is the score that counts for the team.

For added entertainment value, a preferred embodiment of the tournament will include the option of "declaring your major", in which one player from each team may be selected to have that players point score in the individual match play doubled. The selected player will be referred to as the "2×" player.

In a further embodiment of the invention, if a team selects a "2×" player, it must also select a player whose scores will not count.

The process is for the names to be withheld from the other team until the selections are made final by each team. At the beginning of the afternoon play, the teams will be asked if they have "declared a major" to allow for both teams to know if it has been selected or not.

In alternate embodiments of "declaring a major", more than one 2× player may be allowed, and there may also be no player whose score does not count.

In a further embodiment of the invention, some or all of the holes of some or all of the matches in the tournament will include a shot clock. When playing a hole at which a shot clock is operative, each player will have a limited time to play each shot. This limited time may, for instance, be measured from the time the player reaches their ball. The limited time may be determined from when the player reaches their ball and determines the yardage to the intended target. The yardage may be considered to be determined when, for instance, a club has been selected by the player. Club selection may, for instance occur at the time the player takes the club from the bag. In a preferred embodiment, the player will be limited to 30 seconds to play each shot upon reaching their ball and determining their yardage to the intended target. Failure to complete the shot within the required time may incur a penalty, which may for instance be a one or more stroke penalty or may result in the hole being forfeited.

In an alternative form of the shot clock, the time may be governed in a manner similar to chess, in which each player gets a set amount of time to complete each hole or the entire course. In this format, the clock timing a player starts when, for instance, the preceding player's ball comes to rest. The player may then stop their clock by striking the ball. In alternative forms of the chess shot clock, a player's clock may be started as soon as the preceding player strikes the ball, or some set time after the preceding player strikes the ball, such as but not limited to, 15 seconds after the previous player strikes the ball.

In tournament regulations of this invention, one or more substitutes may be allowed in any of the matches. In a preferred embodiment, one substitute is allowed in the afternoon individual match play matches.

Tournament scoring. The winning team will be the team with the most points at the end of each tournament. In a preferred embodiment, a willing team will receive 3 points, a losing team 0 points, and in the event of a tie both teams will receive 1 point. In alternative tournament scoring, there may be bonus points for the magnitude of the victory. For instance, if a team wins by 12 or more points, they may score a bonus point.

In a preferred embodiment of the invention, the matches and scoring include virtual and remote participation by the Pro Team Golf (PTG) membership. For instance, any person around the world may become a PTG member by, for instance, paying an annual membership fee to PTG or paying to participate in a tournament. Membership advantages may include, but are not limited to, the following benefits:

1. Right to become a member of a PTG team of the member's choice ("Team Member").
2. Team Members receive rewards and benefits based on the performance of the team during match play.
3. Team Members may travel with the team and attend all matches.
4. Team Members are also entitled to attend or participate in team-sponsored events, recreational tournaments and instructional camps run by Team players.
5. Access to web site database with complete league, team and player statistics.
6. Discounts on purchases from PTG sponsors, including golf equipment and related travel packages.

Team Members may also play a significant role in the actual competition. A Team Member may provide selections or recommendations for, for instance, line-ups, order of play and 2× selections to coaches prior to the match. Other teams do not know the actual line-ups or other selections of the opposing team until the match commences. A team may allow the Team Member to have an advisory role in other strategy decision. The input provided by the Team Members may also determine some elements of the scoring in the match. Team Members may select, or influence the selection of, their "2×" player for the match. Thus, the PTG concept is a true merger of virtual and reality golf play. The selection may, for instance, be performed via a password protected website, or by email, text-message, voice-message or fax using an internet connection, a telephone, a wireless phone, a personal computer, a personal digital assistant or an other suitable communications device or method. A suitably accessible database with team statistics may be available to help members make decisions.

In a preferred embodiment of the invention, each tournament is played as part of one of organized league. The organization may, for instance, have multiple leagues such as, but not limited to, the North American league, the European league, the Asian league and the Southern Hemisphere league or the league may be a regional league such as a Southeastern US league. Each league may, for instance, comprise from 8 to 32 teams and may have one or more associated minor leagues. Each team may, for instance, have 12 active players and play 24 one-day matches of team golf per season. These matches may, for instance, be compressed into 8 weekends by having four teams meet at a location for the weekend and play one of the other teams on each of three days. In this way, on each of the three tournament days, two inter-team matches will be taking place, one of which may, for instance, be started shotgun fashion off the $1^{st}$ tee, while the other is started shotgun fashion off the second tee.

Each league may, for instance, be divided into two divisions of 16 teams, and may play each of the other teams once and 3 teams (rotating from year to year) from the other division, for a total of 18 matches at 2 home and 6 away venues.

Under a three league format, 16 teams will be eligible for the play-offs, namely the two division leaders in each league, as well as the next three point-leaders, in each league, and one wild card, that has the next highest point total from any of the three leagues. The playoffs will start with one weekend of four tournaments, at the venue of the league leaders and the next highest point total. These four tournaments will be winner take-all, knockout events. Each of the winners from the four tournaments will be paired for a best of three game series. The winner of each of these two events will then play for the championship. The championship may, for instance, be decided by a three game series held at a predetermined, neutral location.

The league may for instance, select and trade players using Soccer style contract system and the playoffs may be a winner take all.

Under a single league format, there may, for instance, be a group of four teams that gather at a venue location and play each other team in single day competitions over three days. The winning team in each game may receive three points for the win or one point for a tie A full regular season may consist of eight weekend series- and thus twenty four games per team. At the end of the regular season, the teams with the highest game point totals may move to an elimination playoff to determine the Pro Team Golf Champion. Each team may field in each game eight players in there separate formats of match play-nine holes of two-ball, nine holes of four-Ball and nine holes of singles.

Purses may, for instance, be awarded to three of the four teams at each venue series, to the regular season leaders, and to playoff participants.

In a preferred embodiment of the invention, fans interact with the game by, for instance, serving as a voting member fan, also known as a Team Pro Coach™, and voting to determine match pairings, order of play and formats through website voting, mobile telecommunication and IM tools. The voting member fans may "declare a Major" player in each format of match play whose point score is doubled in the competition, also known as the 2× Player. The team line-up, pairings and 2× selection may be hidden from the other team. Fans may win weekly and season prizes based on their participation, including the accuracy of their participation via for instance their Strat.e.Q™ which is their Strat.e.golf™ score, both of which are discussed in more detail below, the team performance, and 2× and favorite player performance.

A venue series may consist of the following format:

T1 v T2 and T3 v T4 on Day 1
T1 v T3 and T2 v T4 on Day 2
T1 v T4 and T2 v T3 on Day 3 where T1, T2, T3 and T4 represent the four teams participating in the venue series.

The team may select eight players in advance that are eligible to participate in each weekend series. The fans may lobby for team strategy on, for instance, a secure team chat room, a blog and through IM tools. The home Team Pro Coach may select and discloses whether 2-Ball or 4-Ball goes first. Each Team's Pro Coach selects players for 2-Ball and 4-Ball pairings. The Pro Coachs may then select the order of play for each 2-Ball, 4-Ball and singles match. The Pro Coach may also select a Team 2× golfer for each format of play. The selections may be withheld from other Team until "polls" close. Separate selections may be made for each of the three games during the weekend.

In a preferred embodiment of the invention, there are a number of membership levels including Basic Membership, Intermediate Membership and All-inclusive Membership.

Basic Membership members, also known as Par Members, may have complete access to the Pro Team Golf website, affiliation with a team of their choice, and be eligible for prizes based on team and favorite player performance.

Intermediate Membership members, also known as Birdie Members, may have the ability to serve as Pro Coach™, be eligible for Strat.e.Golf™ prizes on a weekly and season basis based on the member's Strat.e.Q™ (i.e. their scoring quotient for Strat.e.golf™ and accurate drives, their success in picking the order and format of play for the home team and accurate 2× selections, their Long drives, and the cumulative scoring of selected 2× and 2 other favorite players on team.

All-inclusive Membership members, also known as Eagle Member, may have personal interaction with the Team and players during season and be eligible for oversized Strat-.e.golf™ prizes. For instance, they may be eligible for weekly Pro-Am tournaments with team players. The highest Strat.e.Q members may be eligible for post-season dinner and golf outings with Team players and Strat.e.QSchool™, that is they may be eligible for participation in post-season clinics, camps and lessons from nationally recognized golf instructors and Team players. They may also be eligible to participate in the League's post-season Coaches Challenge™ golf tournament.

Pro Coach Scoring

The Pro Coach, i.e., the participating fan, receives two performance scores during each Team v. Team Game. First, the Pro Coach receives a Strat.EQ representing the accuracy and success of the Pro Coach's match selections for the Game. Secondly, the Pro Coach receives a Long Drive Score representing the cumulative match point scores of the Pro Coach's 2× player and 2 other selected favorite players during the Game. Strat.EQ is averaged for the 24 Games during the regular season with a separate Strat.EQ for the playoffs. The Long Drive Score is cumulative for the regular season and separately tracked during the playoffs.

Compiling Strat.EQ

Two points are received for each accurate pairing of players for the total of 8 2-Ball and 4-Ball matches (maximum score-16 points). Example: The Pro Coach selects Player A and Player B to be paired during a 2-Ball match. The consensus vote of the voting Pro Coaches for the Team agree with this selection. Two EQ points are awarded to the Pro Coach for that match.

One point is received for each accurate order of play selection for each of the 8 singles matches (maximum score-8 points). Example: The Pro Coach selects Player A to lead off in singles. The consensus vote of the voting Pro Coaches for the Team agree with this selection. One EQ point is awarded to the Pro Coach for that match.

Four points are received for each accurate 2× selection during the 3 formats of play (maximum score-12 points).

Four points are received for each match victory for the Pro Coach's correct selections from 1, 2 and 3 above (maximum score-64 points). Example: The Pro Coach accurately selected a 2-Ball pairing. If the Pro Coach's team wins that match, four EQ points are awarded to the Pro Coach. For singles matches, the Pro Coach will receive four EQ points for each match victory for which Pro Coach accurately selected the order of play.

| Measuring the Pro Coach Game Strat.EQ | |
| --- | --- |
| Maximum Strat.EQ = | 100 points |
| Genius Strat.EQ = | 75 points or more |
| High Strat.EQ = | 50-74 points |
| Average Strat.EQ = | 25-49 points |
| Dunce Strat.EQ = | 0-24 points |

Long Drive Score

Each Pro Coach makes 3 separate 2× selections during each Game. In 2-Ball and 4-Ball matches, the Team score of the pairing containing the 2× player is counted. The Pro Coach also can select 2 other favorite or "hot" players whose Game point totals will be separately cumulated for each Pro Coach. The Pro Coach will receive the cumulative point totals from each of those matches as his Long Drive Score during the Game.

EXAMPLE

| | Match Score | Match Point Totals |
| --- | --- | --- |
| 2X 2-Ball match | 3 and 2 win | 10 |
| 2X 4-Ball match | 1 up | 2 |
| 2X singles match | 5 and 3 win | 16 |
| 1st Hot Player match 1 | loss | 0 |
| 1st Hot Player match 2 | 2 up win | 2 |
| 1st Hot Player match 3 | loss | 0 |
| 2d Hot Player match 1 | 4 and 3 win | 7 |
| 2d Hot Player match 2 | 5 and 4 win | 9 |
| 2d Hot Player match 3 | even | 0 |
| Game Long Drive Score | | 46 |

One of ordinary skill in the art will appreciate that the methods of implementing a golf tournament described above may be readily implemented using one or more computers and may also be integrated into a conventional golf tournament television broadcast.

FIG. 1 is a schematic drawing showing a broadcast golf tournament being staged in accordance with a preferred embodiment of the present invention. The tournament to be broadcast is typically staged on a golf course 12 by teams comprised of one or more players 14. The teams may also include non-playing members 16 such as, but not limited to, spectators who are pre-registered as fans of the team, coaches, managers and other support personal 16. The golf tournament is captured by appropriate technology. For instance, a television broadcast is captured by one or more television cameras 20 and associated microphones. A radio broadcast may be captured by microphones alone, and an internet broadcast may be captured by, for instance, global positioning satellite (GPS) devices attached to players or in the golf balls providing 2 or 3 D positional data as a function of time. The data representing the event, i.e., the television pictures and the associated audio in the case of a televised event, is then broadcast by distribution over a network 22 to end-user equipment where non-playing team members may access the tournament. The data representing the event may be coded in any of the well-known analogue and digital formats for encoding television, radio and data signals. The network 22 may be, but is not limited to, a cable television network, a terrestrial television broadcast network, a satellite broadcast network, a radio network, or a data network such as the Internet. The end-user equipment may include, but is not limited to, television sets 26, video equipped telephones 24 and fixed or portable personal computers 28. The end user equipment may be linked to the network via wired or wireless electromagnetic connections, or some combination thereof. The broadcast may also include data from a central server 32 that may be incorporated into the broadcast or may be supplied as, for instance, a separate data channel. The central server 32 may be computer hardware running suitable software modules under the control of one or more operators. The software modules may allow the central server to interact with the end-user modules via the broadcast network 22 or the interaction may be via a separate data network 30. The data network may, for instance, be, but is not limited to, a wide area network (WAN), a cable television network, the Internet or a wireless data network.

The modules running on the central server 32 are capable of interacting with end-users via the end-user equipment for the purposes of registering the end-user a registered non-playing member of one of the participating teams. This registration may be performed using the technology used in the well known pay-per-view form of television distribution as described in, for instance, U.S. Pat. No. 5,367,330 issued to Haave et al. on Nov. 22, 1994 entitled "Pay-per-view television delivery system", the contents of which are hereby incorporated by reference.

The software modules running on the central server 32 are further capable of using the interactive program guide technology to collect the registered viewers' vote.

When a vote has been taken and tallied, the resultant decision may then be relayed to one or more of the participating players in the case of an ordering of the team or it may remain secret until the event is over in the case of a choice of a 2× player.

In a further preferred embodiment of the central server 32 may make use of the selected 2× player in scoring the matches as the tournament unfolds without revealing the selection to either the players or the audience. There may then be a competition to guess the identity of the 2× player based on the score. Alternately, the central server 32 may initially calculate the tournament score without using the 2× player, and at some stage such as, but not limited to, prior to the final round of the tournament, reveal the players identity and recalculate the score. In another alternative embodiment, the 2× may be revealed at the end of the tournament and then score recalculated then.

Figure 2:
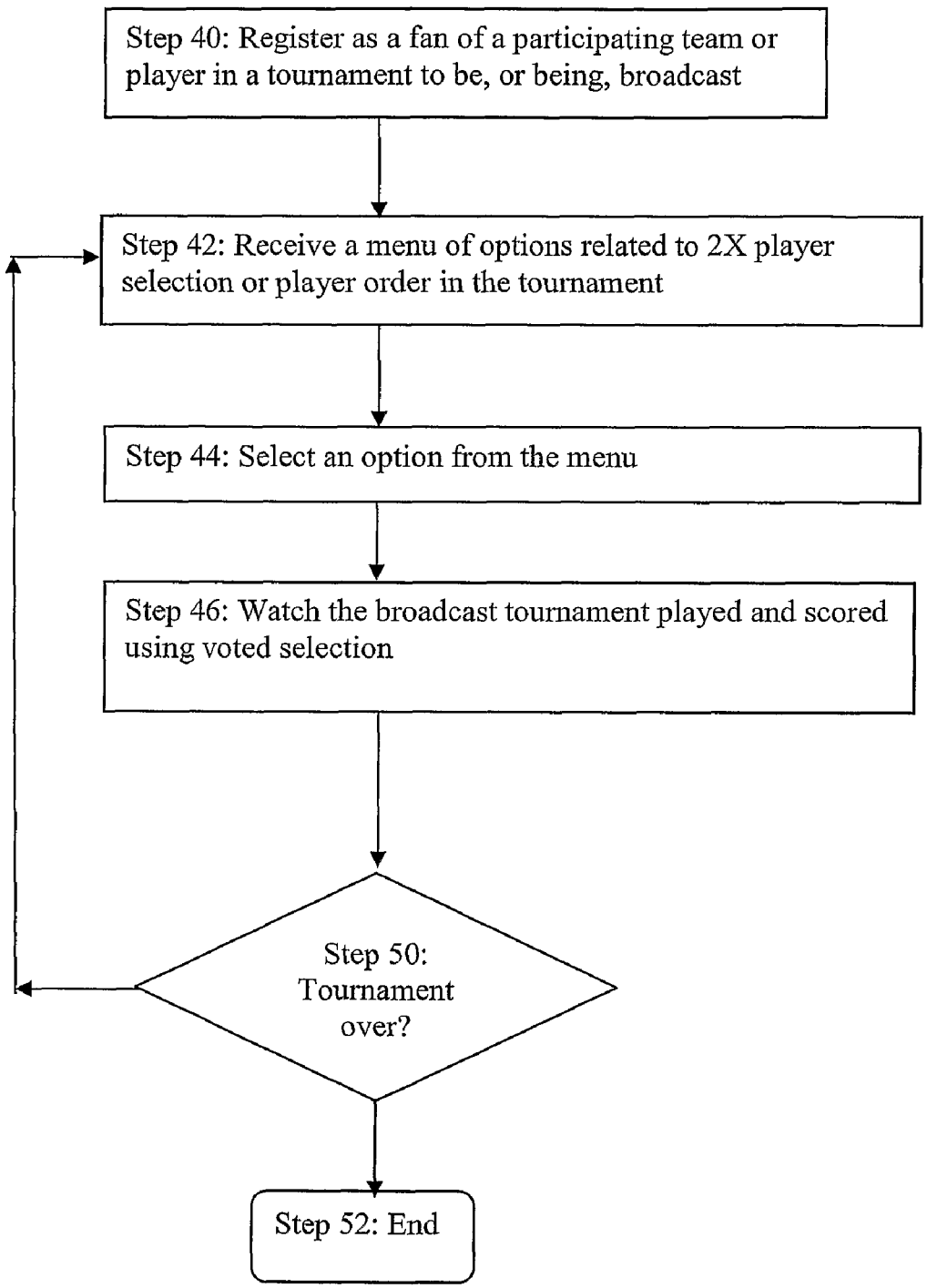
FIG. 2 is a flow chart showing the steps by which viewers of a broadcast golf tournament may influence the course and outcome of the tournament in accordance with a preferred embodiment of the present invention.

FIG. 2 is a flow chart showing the steps by which non-playing members viewing a broadcast event, either at the event or remote to the golf tournament, may influence the course and outcome of the tournament in accordance with a preferred embodiment of the present invention.

In step 40, a viewer of a tournament that is about to be, or is already being broadcast may register to participate as a fan, or decision influencing non-playing member, of one of the teams or players participating in the event.

Prior to or during the event, the pre-registered non-playing member of a team will, in step 42, receive a menu of options related to, for instance, the order in which the members of the team are to play or who is to be the 2× player or which players scores will not be counted.

In step 44, the pre-registered non-playing member will make a selection from the menu. This selection may include using a cell-phone, either at the event or remote to it, a television remote in a fashion similar to the way a channel selection is made from an electronic programming guide, and may use similar technology as detailed in the US patents cited previously.

In step 46, the non-playing team member may watch the broadcast tournament played and scored using the voted selection.

In step 50, if the tournament is not over and there are more 2× picks, player substitutions or team ordering decisions or to be voted on, the next menu of options will be presented in step 42. If the game is over or there decisions to be participated in by the pre-registered non-playing team members, the service ends in step 52.

Figure 3:
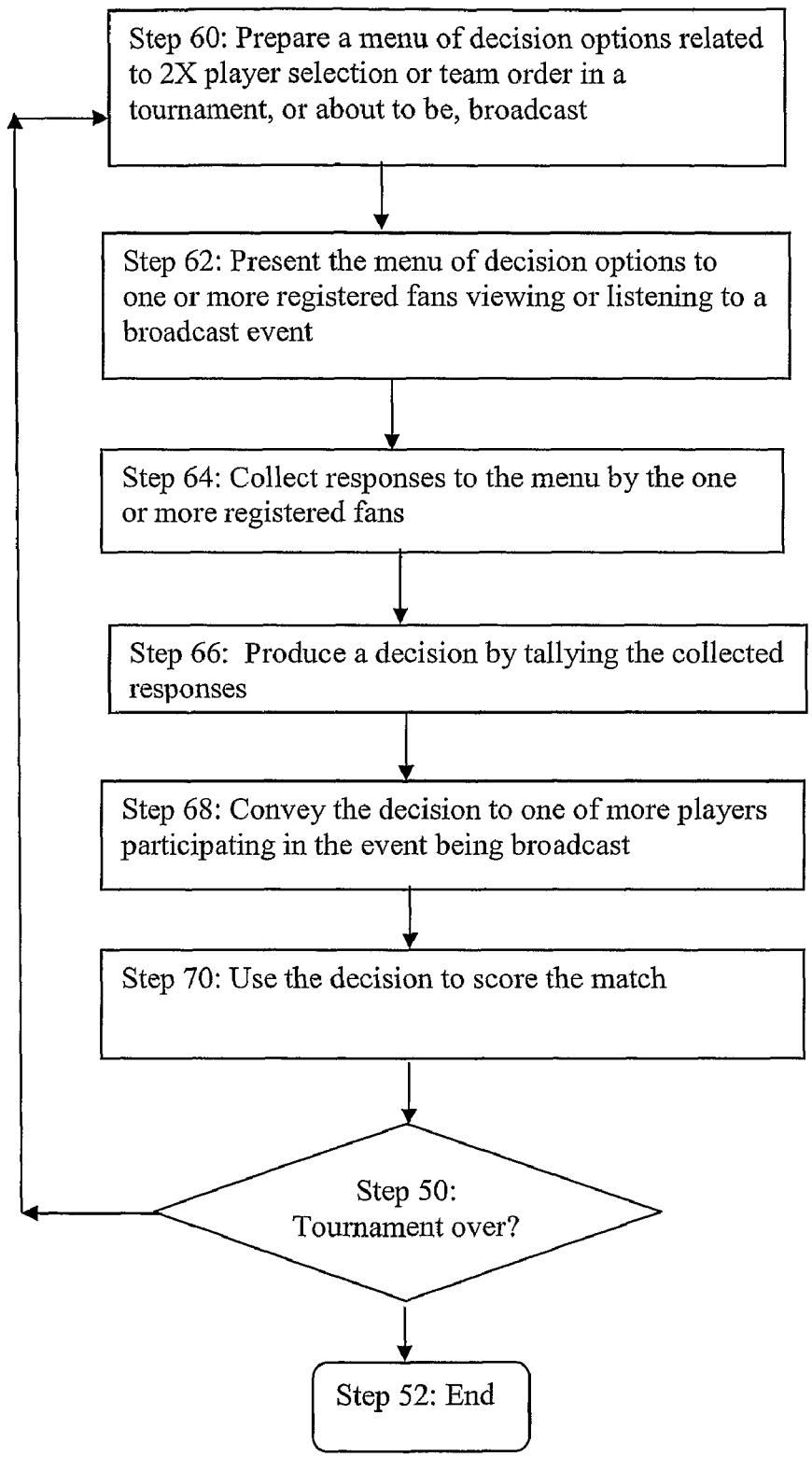
FIG. 3 is a flow chart showing the steps in gathering, tallying and relaying the voting from the non-playing to one or more players of the participating teams in accordance with a preferred embodiment of the present invention.

FIG. 3 is a flow chart showing the steps in gathering, tallying and relaying the voting from the non-playing to one or more players of the participating teams in accordance with a preferred embodiment of the present invention.

In step 60 a menu of decision options related to 2× player selection or team order in a tournament, or about to be, broadcast.

In step 62 the menu of decision options is presented to one or more registered fans viewing or listening to a broadcast event.

In step 64 responses to the menu by the one or more registered fans are collected.

In step 66 a decision is produced by tallying the collected responses.

In step 68 the decision is conveyed to one of more players participating in the event being broadcast.

In step 70 the decision made by the non-playing team member is used to score the match and the tournament.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

INDUSTRIAL APPLICABILITY

In the fields of sporting event management, advertising and television broadcast there is significant interest in methods and systems for improving the appeal of golf tournaments. Such a method and system would be of considerable utility as, for instance, the basis for providing a more entertaining golf tournament to attract viewers, sponsors and advertisers.

What is claimed:

1. A system for enhancing a match play golf tournament played by a plurality of players each playing a predetermined number of matches on one of several teams, said system comprising:

means for awarding match points to players wherein players get a score directly proportional to the number of holes ahead the player is at the end of each match or the number of holes won at the point where the player has an insurmountable lead over at least one opponent player plus the number of holes remaining in that match; and, means for adding up the number of match points each player accumulates for his or her team during the course of said tournament, wherein the winner of the tournament is the team and the players on said team with the greatest sum of match points, wherein each of said teams has a plurality of non-playing members, one of more of said non-playing members being remote from said tournament and further comprising means for designating a 2× player by a vote by said non-playing members and wherein said vote comprises transmitting, by one or more of said non-playing members remote from said tournament, a preference by one of a phone message, a text message, an e-mail, an web menu selection or a television menu selection, and wherein said tournament comprises at least one foursomes match, at least one four-ball match, and one individual match play match wherein said matches are played according to the relevant rules governing a Ryder Cup tournament except for at least one Ryder Cup rule related to scoring.

2. A system for a golf tournament comprising:

means for scoring a match of golf using a number of holes ahead and a number of holes remaining; and, means for awarding a number of points for winning said match, said number of points awarded varying depending on either said number of holes ahead or said number of holes remaining, or a combination thereof, wherein each of said teams has a plurality of non-playing members, one of more of said non-playing members being remote from said tournament and further comprising means for designating a 2× player by a vote by said non-playing members and wherein said vote comprises transmitting, by one or more of said non-playing members remote from said tournament, a preference by one of a phone message, a text message, an e-mail, an web menu selection or a television menu selection.

* * * * *